(12) United States Patent
Barua et al.

(10) Patent No.: US 8,249,956 B1
(45) Date of Patent: Aug. 21, 2012

(54) INVENTORY VARIANCE DETECTION MODELING

(75) Inventors: Abhik Barua, Overland Park, KS (US); Deandra T. Cassone, Overland Park, KS (US); Richard R. Motilal, Overland Park, KS (US); Kerri M. Stuecken, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 119 days.

(21) Appl. No.: 12/729,601

(22) Filed: Mar. 23, 2010

(51) Int. Cl.
*G06Q 10/00* (2006.01)
(52) U.S. Cl. .......................................... 705/28; 705/22
(58) Field of Classification Search .................... 705/22, 705/28
See application file for complete search history.

(56) References Cited

OTHER PUBLICATIONS

Dickens et al., Employee Crim and Monitoring Puzzle, Journal of Labor and Economic vol. 7, No. 3 (Jul. 1989), pp. 331-347.*
Sackett, Integrity Testing for Personnel Selection, Current Directions in Psychological Science, vol. 3, No. 3 (Jun. 1994), pp. 73-76.*
Howell, et al., Pattern Analysis of Data for Control System Diagnosis, European Management Journal, vol. 15, No. 2, pp. 167-173 (1997).*
Camdereli, Operational Inefficiencies in Supply Chains: Performance, Coordination and the Role of Information Systems, Disseration for Docotor of Philosophy in the Jenan-Flagler School of Business U.N.C., Chapel Hill 2007.*
Barua, Abhik, et al., "Inventory Loss Prediction", U.S. Appl. No. 12/854,338, filed Aug. 11, 2010.

* cited by examiner

*Primary Examiner* — Scott Zare
*Assistant Examiner* — Michael Maicher (57) ABSTRACT

A system of inventory variance detection modeling is described. The system comprises a server computer, a processor, a memory, and an application stored in the memory that, when executed by the processor, receives a report associating electronic serial numbers of devices with a plurality of instances of inventory shrinkage. The system also assembles a list of electronic serial numbers of devices associated with instances of a first type of inventory shrinkage. The system also receives a report of the processing history of the devices associated with the electronic serial numbers contained in the list in a plurality of non-logistics and non-warehousing systems. The system also determines the statistical correlation of electronic serial numbers contained in the list with each of a plurality of exceptions processed by at least one of the non-logistics and non-warehousing systems.

20 Claims, 5 Drawing Sheets

INVENTORY VARIANCE DETECTION MODELING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Inventory shrinkage is the loss of products between point of manufacture or purchase from supplier and point of sale. Inventory shrinkage can adversely impact a company's profit margins and may result in increased costs to the company's customers. Inventory shrinkage may be due to product damage, loss, misplacement, and other causes. Inventory shrinkage may also be due to damage in transit, administrative problems such as shipping errors, warehouse discrepancies, and misplaced goods. Shrinkage may also be attributable to fraud perpetrated by manufacturers and shippers of goods. When dealing with some perishable goods, such as produce, natural spoilage may become a source of shrinkage. Other perishable goods, such as time-dated material comprising newspapers and magazines, may be subject to shrinkage due to shipping and forwarding delays. Inventory shrinkage not related to shipping, receiving, and warehousing may occur at the point of sale. A point of sale system should observe employee actions, particularly in the areas of providing discounts, markdowns, and refunds. Management oversight and auditing of these actions may reduce inventory shrinkage.

SUMMARY

In an embodiment, a system of an inventory variance detection modeling is described. The system comprises a server computer, a processor, a memory, and an application stored in the memory that, when executed by the processor, receives a report associating electronic serial numbers of devices with a plurality of instances of inventory shrinkage. The system also assembles a list of electronic serial numbers of devices associated with instances of a first type of inventory shrinkage. The system also receives a report of the processing history of the devices associated with the electronic serial numbers contained in the list in a plurality of non-logistics and non-warehousing systems. The system also determines the statistical correlation of electronic serial numbers contained in the list with each of a plurality of exceptions processed by at least one of the non-logistics and non-warehousing systems.

In an embodiment, a processor-implemented method of inventory variance detection modeling is provided. The method comprises determining that a first correlation of a plurality of instances of a first type of inventory shrinkage with a first exception processed by a first non-warehousing system is of a statistical significance greater than a first defined threshold. The method also comprises implementing a first process change to a first process based on analysis of the first correlation. The method also comprises determining that a second correlation of a plurality of instances of a second type of inventory shrinkage with a second exception processed by a second non-warehousing system is of a statistical significance greater than a second defined threshold, is less than the first defined threshold, and is therefore inconclusive, and further suggesting determining a third correlation using the second type of inventory shrinkage. The method also comprises determining the third correlation of a plurality of instances of the second type of inventory shrinkage with a third processing event associated with a third non-warehousing system wherein the third correlation is determined to be of a statistical significance greater than the first defined threshold. The method also comprises implementing a second process change to a second process based on an analysis of the second correlation and the third correlation. The method also comprises determining that a fourth correlation of a plurality of instances of a third type of inventory shrinkage with a fourth exception processed by a fourth non-warehousing system is of a statistical significance less than the second defined threshold. The method also comprises disregarding the fourth exception as related to the fourth type of inventory shrinkage based on an analysis of the fourth correlation.

In an embodiment, a system of inventory variance detection modeling is provided. The system comprises a server computer, a processor, a memory, and an application stored in the memory that, when executed by the processor, determines that a first correlation of a plurality of instances of inventory shrinkage with a first exception type processed by a first non-warehousing system is below a first defined statistical threshold. The system also determines that a second correlation of the plurality of instances of inventory shrinkage with a second exception type processed by a second non-warehousing system is below the first defined statistical threshold. The system also determines, based on the first correlation and the second correlation, that the occurrence of instances of the inventory shrinkage are random. The system also analyzes a warehousing environment for sources of the inventory shrinkage. The system also determines that the occurrences of instances of the inventory shrinkage are associated with at least one of hiring, compensation, and training issues in the warehousing environment. The system also recommends changes to implementation of at least one of hiring, compensation, and training in the warehousing environment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure discloses a system of inventory shrinkage detection modeling to address inventory shrinkage by determining statistical relationships between inventory shrinkage and processing events in a plurality of internal systems of an organization. Inventory shrinkage may originate in the organization's warehousing and logistics environments, in its information systems, or elsewhere. Through analysis of statistical correlation of instances of inventory shrinkage with patterns of some information processing events, insight may be gained into the sources of shrinkage. The present disclosure discloses that high correlations of inventory shrinkage with patterns of certain processing events may suggest anomalies or structural problems with information systems. Low correlations may indicate that inventory shrinkage is not attributable to systems anomalies or problems and may suggest looking beyond information systems to training, hiring, and compensation issues with personnel handling inventory.

A telecommunications service provider may use a plurality of information systems to actively maintain points of customer contact. The information systems may generate a plurality of different processing events that may occur in frequencies or patterns that upon analysis may point to sources or causes of inventory shrinkage. Such processing events may be anomalous or normal in occurrence. An order management system may, for example, repeatedly generate a specific exception, error message, or warning when performing an operation involving a model of mobile telephone that passes through a specific warehouse. A ticketing system may frequently generate tickets involving equipment serial numbers for mobile telephones not being in the proper sequence when sold by a regional network of electronics retailers. A billing system may generate customer invoices with incorrect sales tax calculations when the invoices are produced by one of the telecommunications service provider's service centers.

The telecommunications service provider may access its plurality of customer contact points throughout the lifecycle of products and customer relationships. The provider may maintain and track equipment serial numbers of wireless devices used by its customers in various applications within its information technology infrastructure. Processing anomalies may occur in the provider's systems for a plurality of reasons including timing of data transfer, exception processing, activation status of devices, and changes in customer data related to customers' subscription arrangements. Processing anomalies may also occur because of software bugs and hardware failures in the provider's systems. Because the provider may operate multiple systems and have many points of contact with its customers during the lifecycle of its devices and subscription relationships, anomalies related to tracking may manifest themselves in the form of inventory shrinkage and inaccuracies.

The present disclosure discloses the researching of problems and anomalies related to inventory shrinkage in a broader range of information systems than those directly related to warehousing and logistics. To obtain a more accurate view of the potential origins of inventory shrinkage, anomalies may be researched not only in the systems wherein shrinkage may have been discovered or suspected to lie, for example in a warehouse or logistics system, but in other systems used during subject devices' overall lifecycle such as order management and problem ticketing systems. Analysis of statistical correlations of inventory shrinkage with processing anomalies and other systems events may identify patterns in the data that may be useful in resolving problems related to shrinkage. When instances of shrinkage with reference to patterns of anomalies are determined to be not random or isolated, i.e. statistical correlation is shown, technical problems with the underlying system(s) may be the cause of shrinkage. Randomness of results, wherein correlation of inventory shrinkage and system anomalies is not shown, may suggest that a process problem may exist in the subject organization, for example a distribution center, and may suggest taking a higher level view of operations that may include revising training and/or hiring practices.

Figure 1:
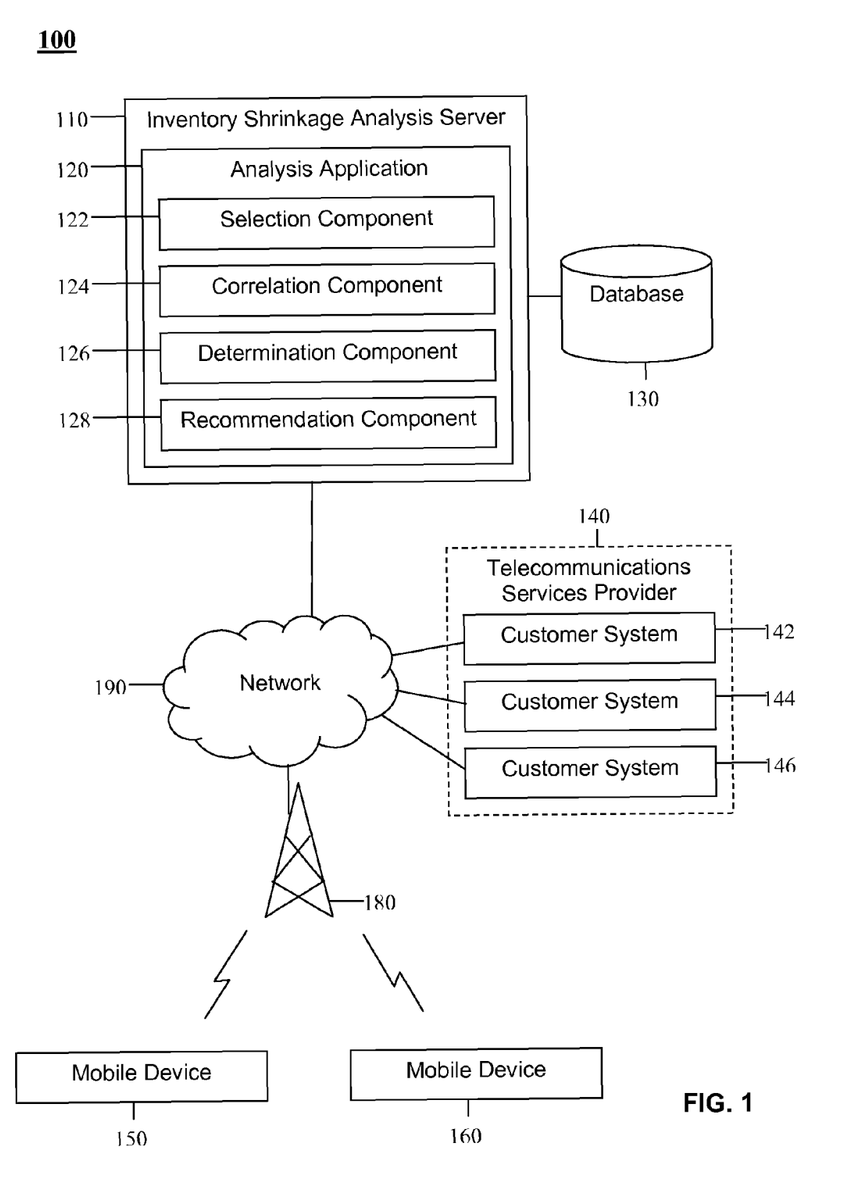
FIG. 1 is a block diagram of a system according to an embodiment of the disclosure.

Turning now to FIG. 1, a system 100 of inventory shrinkage analysis and remediation is described. The system 100 comprises an inventory shrinkage analysis server 110, an analysis application 120, a database 130, a telecommunications service provider 140, customer systems 142, 144, 146, mobile devices 150, 160, a base transceiver station 180, and a network 190. The shrinkage analysis server 110 and the customer systems 142, 144, 146 may be computer systems. Computer systems are discussed in detail hereinafter.

The inventory shrinkage analysis server 110 may be implemented by a computer system. Computer systems are described in detail hereinafter. The analysis application 120 executes on the inventory shrinkage analysis server 110 and searches for relationships between instances of inventory shrinkage and processing events in customer systems 142, 144, 146 that may comprise customer management systems, order processing systems, and other electronic tools used by the telecommunications service provider 140. The analysis application 120 captures electronic serial numbers of mobile devices 150, 160 involved in inventory shrinkage. The term electronic serial number as used herein may be broadly construed and may comprise the electronic serial number (ESN) and/or mobile equipment identifier (MEID) designations used to uniquely identify mobile telephones incorporating one of the advanced mobile phone system (AMPS), time division multiple access (TDMA), and code division multiple access (CDMA) technologies. Electronic serial number as used herein may also comprise the international mobile equipment identity (IMEI) designation associated with mobile telephones that may use one of the global system for mobile communications (GSM), wideband code division multiple access (W-CDMA), and integrated digital enhanced network (iDEN) technologies. The term electronic serial number as used herein may comprise additional serial number designations used for other current or future mobile phone technologies and other electronic devices as described herein that may comprise personal digital assistants (PDA) and media players.

Inventory shrinkage may be defined as the loss of mobile devices 150, 160 between point of manufacture or purchase from manufacture or supplier and the point of sale. For the telecommunications service provider 140, inventory shrinkage may comprise the disappearance or loss of mobile devices 150, 160 from a warehouse location of the telecommunications service provider 140 wherein the mobile devices 150, 160 were recorded as received by the warehouse but were never noted as having then left the warehouse and could not be found in a physical inventory count of the warehouse.

Inventory shrinkage may also comprise instances of these lost mobile devices 150, 160 being found later in the marketplace in partially or fully activated status. Inventory shrinkage may additionally comprise mobile devices 150, 160 having been recorded as received by the warehouse but subsequently being returned to their manufacturer in damaged state without proper documentation as to the circumstances of their damage. Inventory shrinkage may also comprise a quantity of mobile devices 150, 160 being discovered in the warehouse not in the proper order in terms of electronic serial number. Inventory shrinkage may also comprise a wide variety of possibly more anomalous or peculiar circumstances, for example wherein one or more mobile devices 150, 160 are recorded as having been received by and then properly shipped from the warehouse to customers or retailers but then inexplicably being found back in the warehouse during a physical inventory count with no documentation available as to these circumstances. These different shrinkage circumstances or scenarios may be referred to in some contexts as different shrinkage types.

The analysis application 120 searches for patterns of mobile devices 150, 160 involved in certain actions by the customer systems 142, 144, 146. Some of the actions may be anomalies or exception-related. The actions may, for example, comprise the production of a peculiar or unusual error message at a significantly greater than expected frequency. The actions may also comprise, for example, receiving the same result of an operation of a customer system regardless of the input to the operation. The analysis application 120 determines levels of statistical correlation between groups of mobile devices 150, 160 and the identified processing actions or events. A significant correlation, wherein a concentration of lost mobile devices 150, 160 appears to be associated with a recurring pattern of specific processing actions by at least one customer system 142, may indicate structural problems, for example a software bug, with the customer system 142. Little or no correlation, or random occurrences of lost devices with regard to the specific processing actions, may suggest that the customer systems 142, 144, 146 are functioning as designed. Randomness of relationships between lost mobile devices 150, 160 and processing actions related to the mobile devices 150, 160 may indicate that underlying problems are not related to structure or functionality of the customer systems 142, 144, 146. Such randomness may instead indicate that inventory shrinkage may be process related and call for examination of training, hiring, and compensation of personnel handling physical inventory or otherwise processing its receipt, storage, and/or shipment to customers.

Inventory loss suspected to be attributable to warehouse problems and physical shrinkage may also correctly show up in ticketing or other customer systems 142, 144, 146 to indicate clues about what is actually occurring. Instances of inventory shrinkage may be associated with normally functioning customer systems 142, 144, 146. While much discussion herein may be concerned with identifying cause and effect relationships between inventory and anomalous or dysfunctional behavior of customer systems 142, 144, 146, it may be of equal or greater value to examine correlations of inventory shrinkage with processing events of customer systems 142, 144, 146 wherein the customer systems 142, 144, 146 are long established to be functioning normally. Inventory shrinkage and overage may be as detectable and traceable by analyzing patterns of normal processing results of customer systems 142, 144, 146 as they are by searching for dysfunctional or abnormal systems behavior. The analysis of both normal and apparently abnormal or anomalous results from customer systems 142, 144, 146 may be valuable in an effort to identify causes of inventory shrinkage.

The present disclosure discloses that subjecting a statistically significant sample size of mobile devices 150, 160 involved in shrinkage to quantitative techniques with reference to processing actions in various internal customer systems 142, 144, 146 may assist in determining if the shrinkage was related to problems with the customer systems 142, 144, 146. A preponderance of inventory losses or discrepancies that occur coincident with recurring processing events or anomalies by the customer systems 142, 144, 146 may point to the customer systems 142, 144, 146 as potential sources of the inventory losses. Whereas inventory shrinkage may initially be suspected to occur in an organization's warehouse operations and be due to breakage, misplacement, or other physical loss, shrinkage may instead be related to problems with internal ticketing and other customer systems 142, 144, 146 used to process customer orders and manage customer requests during the lifecycle of mobile devices 150, 160. Inventory loss initially suspected to be attributable to warehouse problems and physical shrinkage may instead have been related to system anomalies or flaws wherein units of product are virtually lost and effectively "fall through the cracks." The present disclosure discloses the use of correlation analysis to determine if such system problems exist. The present disclosure additionally discloses the accessing of data from a broader range of an organization's information technology resources than may be traditionally examined in connection with inventory shrinkage problems. Historical data generated by the customer systems 142, 144, 146 may be stored in the database 130. The components of the analysis application 120 may draw the historical data from the database 130 and use the historical data in performing analyses.

The telecommunications service provider 140 may, for example, operate warehouse facilities or contract with a logistics services provider to operate its warehousing facilities. The telecommunications service provider 140 may be a provider of wireless communications services and may sell numerous models of mobile devices 150, 160 for use by its customers under a variety of subscription plans. Maintaining correct serialization of mobile devices 150, 160 may be important to the telecommunications service provider 140 in the provisioning and linking of electronic serial numbers of the mobile devices 150, 160 to customer subscription accounts. Tracking correct serialization of mobile devices 150, 160 may also be a requirement of the U.S. Federal Communications Commission (FCC). Each electronic serial number provided by a manufacturer of mobile devices 150, 160 may be closely linked by the telecommunications service provider 140 to a specific subscriber account number. Successful completion of authorization actions required by the telecommunications service provider 140 and authentication steps followed by the subscriber may be predicated on the tight linkage of the electronic serial number to the subscriber's account information. Inventory shrinkage, whether due to physical or other loss in a warehouse or logistics environment or alternatively due to system problems wherein mobile devices 150, 160 may be improperly processed and virtually "disappear" and may later reappear, may be disruptive to the authorization and provisioning process.

The present disclosure describes analysis beyond traditional warehousing and logistics systems to determine if additional information beyond these systems may reveal patterns of processing anomalies resulting in inventory shrinkage. Core logistics systems, along with customer ordering, service, and repair systems that may comprise customer systems 142, 144, 146 may be analyzed to attempt to arrive at a plausible explanation for the loss of mobile devices 150, 160. A customer service system may, for example, show that a specific mobile device 150 is active, but a warehouse system may show no record of the mobile device 150 ever having been shipped. Researching the mobile device 150 in other customer systems 142, 144, 146 may identify the problem that may ultimately be attributable to a duplicate electronic serial number having at some point been mistakenly entered. Examining data related to the mobile device 150 at a plurality of points of customer contact in the customer systems 142, 144, 146 of the telecommunications service provider 140 beyond warehousing and logistics systems may promote the telling of a more complete story about the shrinkage. The events that occur during customer interactions and across the life of the mobile device 150 and term of subscription may provide meaning to information provided by warehousing and logistics systems and promote insights into non-traditional causes of shrinkage and inventory discrepancy.

The present disclosure may use terms such as exceptions, processing events, processing actions, and anomalies to characterize variables that may be used in calculating statistical correlation with instances of inventory shrinkage and overage that may be represented by electronic serial numbers. The present disclosure describes systems and methods for determining correlation between inventory shrinkage and the exceptions, processing events, processing actions, and anomalies that may be the result or output of the operation of customer systems 142, 144, 146 performing processing actions using electronic serial numbers associated with inventory shrinkage. Exceptions, processing events, processing actions, and anomalies as described herein may be interpreted broadly to be the result of a processing operation by at least one customer system 142, 144, 146 wherein at least one electronic serial number of a mobile device 150 may be an input to the processing operation. In statistical correlation determination actions described herein, electronic serial numbers may be independent variables that may be varied at the selection of the analysis application 120. Exceptions, processing events, processing actions, anomalies, or other output or result of processing by customer systems 142, 144, 146 may be the dependent variables, or variables that depend upon the selection of electronic serial numbers for examination. While the majority of the discussion herein may be directed to inventory shrinkage wherein inventory may be lost due to misplacement, breakage, problems with customer systems 142, 144, 146, or other causes, the present disclosure also extends to problems related to inventory overage. The phenomenon of excess inventory may indicate problems in the warehouse environment, with customer systems 142, 144, 146, or elsewhere that may be equally or more disruptive to operations and financially harmful as inventory shrinkage.

The analysis application 120 receives listings of electronic serial numbers of mobile devices 150, 160 associated with inventory shrinkage. The analysis application 120 may segregate the mobile devices 150, 160 by the observed event, condition, or anomaly associated with the shrinkage as reported by a warehouse or other logistics system. An observed event or condition may, for example, be the mobile devices 150, 160 were recorded as entering the warehouse but were never recorded as having been shipped from the warehouse, pointing to misplacement or unreported breakage. An observed event or condition may also, for example, be the mobile devices 150, 160 having been recorded as entering the warehouse and recorded as subsequently shipped from the warehouse but for unknown reasons later appearing back in the warehouse during inventory counts. The analysis application 120 may segregate a population of mobile devices 150, 160 observed to have been subject to one of these or other shrinkage types. The grouping of these subject mobile devices 150, 160 may be one variable in a statistical analysis taught by the present disclosure.

The analysis application 120 may then analyze these mobile devices 150, 160, as represented by their electronic serial numbers, in relation to the involvement of these mobile devices 150, 160 in at least one processing event or anomaly produced by of a customer system 142. These systems may be outside of the standard warehousing, logistics, or inventory management systems that may traditionally receive heavy analysis when inventory shrinkage is a problem. The customer systems 142, 144, 146 may be used by support personnel employed by the telecommunications service provider or a supporting organization to assist with customer questions or problems or in service provisioning, delivery, or billing. The customer systems 142, 144, 146 may be order management software that receives orders from a plurality of the other systems of the telecommunications service provider 140. The customer systems 142, 144, 146 may be electronic ticketing systems that retailers use to create orders for mobile device 150 exchanges or other issues or systems that contain tickets generated by customers if they have received mobile devices 150, 160 in the wrong quantity or the mobile devices 150, 160 were received with electronic serial numbers in the wrong order, for example.

Each of the factors that may be considered in correlation analysis may be represented by variables. As noted, mobile devices 150, 160 may be represented by electronic serial numbers. They may also be represented by billing account numbers (BAN) or other identifier or designation. The analysis application 120 may select a group of mobile devices 150, 160 discovered to have been subject to inventory shrinkage during a common time frame or under a specific set of circumstances. The telecommunications service provider 140 may have detected unusual patterns of inventory shrinkage during a time period, within a certain model of mobile device 150, or at a certain warehouse location, for example. Ranges of electronic serial numbers, billing account numbers, or other identifiers associated with the detected shrinkage may be determined.

After determining the range of variables identifying the mobile devices 150, 160, for example electronic serial numbers, subject to instances or patterns of inventory shrinkage, the analysis application 120 then determines the variable against which the instances of shrinkage are to be measured. The output of processing events of a plurality of customer systems 142, 144, 146 may be used by the analysis application 120 to determine the correlation with instances of inventory shrinkage, if any. As noted, the present disclosure describes examining the processing events of a plurality of customer systems 142, 144, 146 with reference to mobile devices 150, 160 determined to have been subject to inventory shrinkage. Each customer system 142 may provide at least one variable that may be useful to examine for correlation against a group of electronic serial numbers. The variables provided by each customer system 142 are specific to the function of the customer system 142. For example, an order management system may have a variable that indicates a specific action taken or result arrived at by the customer system 142. A ticketing system used by retailers to create customer orders for product exchanges or other issues may generate ticket numbers. A billing system may contain one or more codes for mobile device status. Instances of 'adjusted out' events, tickets, or codes described in examples above may be used in determining correlation with mobile devices 150, 160 involved in instances of shrinkage.

The analysis application 120 may calculate statistical correlations involving many categorizations of variables. The present disclosure describes the analysis application 120 calculating a plurality of correlations to determine if concentrations of lost or compromised mobile devices 150, 160 have also been involved in one or more of the same processing events or anomalies in at least one of the customer systems 142, 144, 146. The present disclosure describes that the involvement of electronic serial numbers of lost or compromised mobile devices 150, 160 may appear randomly in the processing events, results, or actions of these customer systems 142, 144, 146 if the customer systems 142, 144, 146 are properly designed and functioning normally. The present disclosure also describes that randomness of relationship is the converse of highly correlated variables.

The present disclosure describes that as long as the plurality of customer systems 142, 144, 146 are working as designed, randomness of results or low correlation between instances of inventory shrinkage and selected processing events of the customer systems 142, 144, 146 may be observed. As taught herein, instances of inventory shrinkage should occur statistically independent of processing events in properly functioning and designed customer systems 142, 144, 146. The present disclosure also describes that high correlations of lost mobile devices 150, 160 with various processing events may point to problems and anomalies with internal systems. Low correlations, or randomness of occurrences of inventory shrinkage with processing events, may point to performance problems in the warehousing environment, for example process problems, wherein employees may not be fully trained in the proper fulfillment of orders.

When the telecommunications services provider 140 experiences an unacceptable level of inventory shrinkage, it may seek to identify the source of the shrinkage and target the underlying cause of the problem. Inventory shrinkage may take a number of forms, including actual loss arising from misplacement and breakage in the warehouse environment and virtual loss, wherein customer systems 142, 144, 146 may not properly track the movement of mobile devices 150, 160 that may be in service. Because of the importance of proper serialization of mobile devices 150, 160 to the telecommunications services provider 140, virtual loss may be equally or more costly than actual physical loss. The cost of physical loss of a mobile device 150 may only amount to the replacement cost of the mobile device 150. When a mobile device 150 that may already be provisioned and in service is not properly tracked and may be associated with the wrong subscriber account, revenue may be lost and significant cost incurred in correcting the problem. Customer satisfaction may also be potentially impacted by the need to contact the customer during remediation of the problem.

The inventory shrinkage analysis server 110 is depicted in FIG. 1 as a separate component from the telecommunications service provider 140. While in some embodiments, the inventory shrinkage analysis server 110 may be owned and operated by the telecommunications service provider 140, in some embodiments the inventory shrinkage analysis server 110 and the analysis application 120 executing therein may be operated by a party other than the telecommunications service provider 140, hence the depictions as separate components. A consultant or a company specializing in order fulfillment, for example, may, in some embodiments, operate the inventory shrinkage analysis server 110.

The telecommunications services provider 140 and its contractors may use a plurality of applications or customer systems 142, 144, 146 in processing the movement of inventory to sale and the tracking of mobile devices 150, 160 after sale. The processing activities of the customer systems 142, 144, 146 may produce or result in a plurality of processing results or events that may be used in statistical analyses with patterns of inventory shrinkage or overage. The customer systems 142, 144, 146 may use base product attributes associated with mobile devices 150, 160. To investigate serial number history or customer order history, these basic product attributes are tracked in many of the customer system 142, 144, 146. The basis product attributes may comprise electronic serial numbers, billing account numbers (BAN), and mobile serial numbers (MSN).

The warehouse management application, the order management customer application, the first electronic ticketing system, the fraud system, the second electronic ticketing system, the third electronic ticketing system, the front end order system, the customer care tool or system, and the billing system described in the following nine paragraphs are examples of customer systems 142, 144, 146 that may be used by the telecommunications services provider 140. These customer systems 142, 144, 146 may also be used by contractors of the telecommunications services provider 140 or other entities working with the telecommunications services provider 140. A description of each customer system 142 is followed by at least one example of the types of processing events that the analysis application 120 may use in correlating with instances of inventory shrinkage and overage.

A warehouse management application may be used for order fulfillment including managing product receiving and warehousing, executing orders, managing product location, and shipping of product. The analysis application 120 may examine such processing events as units received, quantity of units found in the warehouse during a physical count, and units shipped out of the warehouse. Each of these processing events may be used in analysis with various measures of suspected or known inventory shrinkage.

An order management application may receive customer orders from various systems of the telecommunications service provider 140. When an order is placed, i.e. entered into this customer system 142, the order is assigned to specific units if inventory is available. This customer system 142 passes the detailed information to the warehouse management application described above. The analysis application 120 may examine processing events such as orders cancelled, orders entered with unusually extended fulfillment times, and orders adjusted under exceptional circumstances.

A first electronic ticketing system is a tool that retail stores selling the mobile devices 150, 160 and other products of the telecommunications services provider 140 may use to create customer orders for mobile device 150, 160, process exchanges of mobile devices 150, 160, or resolve other issues with mobile devices 150, 160. Orders entered into the electronic ticketing system may be transmitted to the order management application described above for further processing. The analysis application 120 may examine unusual patterns of customer orders entered by particular retail stores including an excessive quantity of cancellations of orders, adjustments to entered orders, and unusually large or small orders.

A fraud system may be a database of some customer names and addresses as well as serial numbers of mobile devices 150, 160 that may have been involved in theft or other suspected or known fraud. The fraud system is used to examine orders for possibilities of various types of fraud including patterns of orders that may raise suspicion of fraud. The analysis application 120 may isolate and correlate instances of inventory shrinkage with known or suspected instances or patterns of fraud originating in specific warehouses, retail locations, or distribution locations.

A second electronic ticketing system may contain tickets generated by customers if the customers have not received mobile devices 150, 160 in the correct quantity ordered. Some mobile device anomalies may occur due to mismatching of customer orders that may result in the creation of tickets in this system. The analysis application 120 may target and perform correlations involving an excess of tickets associated with a single customer or group of customers. Correlations may also be performed and analyzed when specific warehouse locations are repeatedly involved in tickets generated using the second electronic ticketing system.

A third electronic ticketing system may deal with specific issues with mobile devices 150, 160 that are shipped to customers. The analysis application 120 may examine irregular or excessive instances of customer reports of mobile devices 150, 160 being broken or damaged, missing components, or bearing serial numbers that conflict with their orders.

A front end order system may be used by sales personnel of the telecommunications services provider 140, dealers, customer care personnel, and others to input orders. These orders may flow through other systems of the telecommunications services provider 140 or others for fulfillment. The analysis application 120 may identify orders entered by certain sales personnel that are adjusted an unusual number of times or are adjusted in unusual ways. The analysis application 120 may target orders entered by specifically identified customer care department personnel wherein the orders are entered coincident with unusual or abnormal activity taking place at specific warehouse locations.

A customer care tool or system may capture information provided by customers. The tool or system may show correlation between personal and/or portable telephone number (PTN), billing account number, and currently active mobile device 150 as well as some memorandum notes. The analysis application 120 may examine entries made by the same customer many times, particularly when that customer may be linked to activities identified by the fraud system. The analysis application 120 may also target customer entries to this customer system 142 that persistently complain about or identify problems with mobile devices 150, 160 that were shipped from one or several specific warehouse locations.

A billing system may connect customers with electronic serial numbers of mobile devices 150, 160. The billing system maintains a history of mobile devices 150, 160, for example when the mobile devices 150, 160 became active. An active status is necessary for a customer to be able to use the mobile device 150. The analysis application 120 may examine repeated or unusual patterns of customer transactions or billing events, particularly when involving the same customers or warehouse locations. The analysis application 120 may target rapid opening and closings of new customer accounts for no apparent justifiable reason.

Mobile devices 150, 160 may be mobile telephones or other portable electronic devices. The mobile devices 150, 160 in FIG. 1 are depicted as communicating via the base transceiver station 180 and the network 190 with the other components. The mobile devices 150, 160 may in embodiments not be as depicted in FIG. 1 and may instead be not activated and in operation and may be physically situated in a warehouse (not shown) associated with the telecommunications service provider 140, with a logistics provider, or elsewhere.

The base transceiver station 180 may be any of a cellular wireless base station, for example a Code Division Multiple Access (CDMA), Global System for Mobile Communications (GSM), Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 180, in an embodiment a plurality of base transceiver stations 180 may be existent and in operation.

The network 190 promotes communication between the components of the system 100. The network 190 may be any communication network including a public data network (PDN), a public switched telephone network (PSTN), a private network, and/or a combination.

The analysis application 120 comprises the selection component 122 that chooses the inputs for the statistical correlation calculations taught herein. The selection component 122 chooses at least one electronic serial number for a mobile device 150 that may have been subject to inventory shrinkage for correlation with at least one type of processing event. The at least one electronic serial number may be chosen by the selection component 122 based on the type of mobile device 150 with which it is associated, the warehouse location at which it was known to arrive, the date on which it arrived, or based on other criteria. The selection component 122 may choose a plurality of electronic serial numbers or one or more consecutive ranges of electronic serial numbers for processing. The selection component 122 may for analysis, comparison, and control group purposes choose electronic serial numbers of mobile devices 150, 160 that were not subject to inventory shrinkage.

The selection component 122 also chooses the customer systems 142, 144, 146 from which to draw instances of specific processing results that may be used in correlation analyses. Depending on the purposes and objectives of the telecommunications service provider 140 or other organization using the system and methods taught herein, the selection component may capture a plurality of instances of one particular result generated by a customer system 142. The result, that may herein alternatively be characterized as an exception, a processing event, a processing action, or an anomaly, may be specific to the customer system 142 or may be a general outcome of a plurality of customer systems 142, 144, 146. While the term "anomaly" may be construed to mean an abnormal or erroneous result, the analysis application 120 may seek to identify situations wherein groups of mobile devices 150, 160 involved in known instances of inventory shrinkage were also subject of an operation of at least one customer system 142, 144, 146 that produced a specific result. The present disclosure describes that such a result does not have to be erroneous to be of interest and ultimately lead to a conclusion that a customer system 142, 144, 146 is failing or suffering from poor design. The selection component 122 targets results or processing events that are of interest in some regard, which may include the production of an outcome that may represent an anomaly. The fact that a result, event, or action of a customer system 142, 144, 146 may be considered to be anomalous does not necessarily mean that the anomaly involved is the reason for the inventory shrinkage. The anomaly may be of value in determining correlations or in performing other analyses but its existence does not indicate that source of inventory shrinkage of the subject mobile devices 150, 160 has been found. The event may only be considered an anomaly because the mobile devices 150, 160 have "virtually disappeared." Events may need to be viewed in their contexts to be seen as anomalous.

A first customer system 142 may, for example, be an order management system and may generate a result of 'order cancelled' for a group of electronic serial numbers were recorded as entering a warehouse, were never recorded as having left the warehouse, and were found months later operating without authorization and/or payment in a foreign country. A second customer system 144 may generate ticket numbers with a certain coding status indicating that the customer was unable to activate the mobile devices 150, 160 because the electronic serial numbers affixed to hardware components of the mobile devices 150, 160 conflicted with at least some of the documentation the customers received. A third customer system 146 may generate a certain type of alert flag when algorithms executing within the customer system 146 determine that fraud may be associated with one or more items of information entered. The selection component 122 in each of the examples cited above may capture a series of the 'order cancelled' results, the coding status results, or the alert flag results for use in calculating correlation between electronic serial numbers and the captured series of these events.

The analysis application 120 also comprises the correlation component 124 that calculates statistical correlations between variables described herein and presents the results for analysis. The correlation component 124 may calculate a plurality of correlations between selected individual or groups of electronic serial numbers associated with mobile devices 150, 160 and processing anomalies, events, or results produced by customer systems 142, 144, 146.

While the discussion of the present disclosure has focused herein on using electronic serial numbers as a variable in correlation calculations, it is not mandatory that every correlation calculation include electronic serial numbers as a variable. The correlation component 124 may use as variables two sets of processing anomalies, events, or results produced by customer systems 142, 144, 146 as variables in a correlation calculation. The output of such a calculation may be of value in determining whether inventory shrinkage is due to problems in a warehouse environment or due to a problem with at least one customer system 142, 144, 146.

The analysis application 120 also comprises the determination component 126 that determines whether correlations calculated are significant and produce a meaningful and possibly actionable result. An organization dealing with inventory shrinkage may cause the analysis application 120 to calculate a plurality of correlations using a variety of variables. The organization may set one or more correlation coefficient thresholds that are necessary to be exceeded for a correlation to be considered significant and worthy of further examination. Depending on a plurality of factors, a threshold may be set a given level and later changed based on analysis and/or upon the introduction of additional variables or factors.

In an example, a first defined threshold and a second defined threshold may be set with the first defined threshold higher than the second defined threshold. After the selection component 122 selects variables for use by the correlation component 124, it may be determined that to be considered significant, calculated correlations should exceed the first defined threshold. Further, when a calculated correlation is greater than the second defined threshold but less than the first defined threshold, the calculated correlation may be considered inconclusive and additional analysis may be performed. The additional analysis may comprise calculating other correlation coefficients wherein one or more of the variables are changed. Based on the additional analysis, it may be concluded that correlation is significant. When a calculated coefficient is less than the second defined threshold, the calculated correlation may be considered to be insignificant and not worthy of additional analysis.

The analysis application 120 also comprises the recommendation component 128 that may generate recommendations for remedial and other action depending on the results generated by the other components of the analysis application 120. The recommendation component 128, based on results of calculated correlations, may identify a customer system 142, 144, 146 that is behaving in a failing, dysfunctional, or anomalous manner. The present disclosure describes that a statistically significant coefficient of correlation between lost mobile devices 150, 160 and a specific processing result, output, or event of the customer system 142 may indicate that the shrinkage may be related to a problem with the customer system 142. What constitutes statistical significance is subject to the determination component 126 and to the judgment of the management of the organization suffering the inventory shrinkage. When the customer system 142 is suspected of as the source of shrinkage based on an initial analysis of at least one coefficient of correlation, the organization may cause several other groups of data to be subject to the actions as taught herein to reinforce initial conjectures and drive toward remedial action. Because addressing the source of a failure of the customer system 142 may involve examining existing software code and writing, testing, and implementing new software code, a plurality of statistical analyses related to correlation calculations as taught herein may be undertaken before a final decision is made.

Analysis of calculated coefficients between mobile devices 150, 160 subject to inventory shrinkage may reveal that instances of inventory shrinkage are random in relation to at least one identified processing result, output, or event of the customer system 142. In this event, the recommendation component 128 may direct that examination of the shrinkage problem look beyond the workings of customer systems 142, 144, 146. The recommendation component 128 may point to implementation of policy in the warehouse and logistics environments of the telecommunications service provider 140. Customer systems 142, 144, 146 may be functioning properly but there may be a need for more or better training of individuals handling inventory in the warehouse. Warehouse personnel may not, for instance, be properly following documented procedures for packing mobile devices 150, 160 and assuring that the electronic serial numbers on mobile devices 150, 160 match order documentation. Fraud prevention procedures may be audited and adjusted. The telecommunications service provider 140 may, after a review of its hiring and compensation practices, make changes to these practices such that more qualified individuals are employed. The telecommunications services provider 140 may alternatively or in addition change its practices so that less qualified individuals upon being hired are initially trained and monitored more closely. The present disclosure describes the calculation and analysis of a plurality of correlation relationships between data variables described herein to identify failures in customer systems 142, 144, 146 that may contribute to inventory shrinkage. When correlations are concluded to be statistically insignificant, the present disclosure describes looking beyond customer systems 142, 144, 146 to implementation of training, hiring, compensation, and other policy within the operations of the telecommunications service provider 140.

Figure 2:
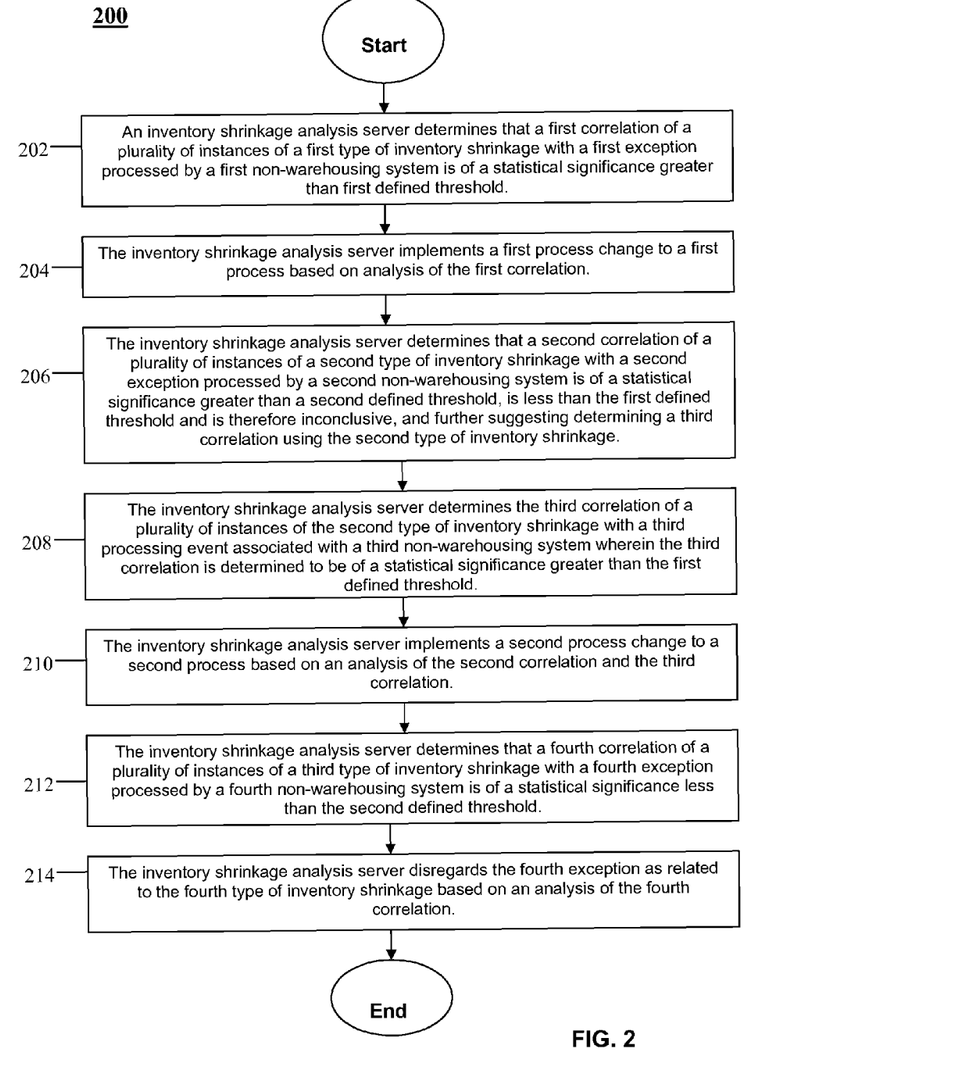
FIG. 2 is a flow chart illustrating a method according to an embodiment of the disclosure.

Turning now to FIG. 2, a method 200 of inventory shrinkage analysis and remediation is provided. The method 200 describes the determination of correlations of three types of inventory shrinkage with processing events generated by several customer systems 142, 144, 146. Two thresholds for correlations have been defined by the method 200, a first defined threshold and a second defined threshold, with the first defined threshold being higher than the second defined threshold. Per the method 200, when correlations are determined to exceed the first defined threshold, they are considered to be of a level of significance such that the instances of the inventory shrinkage are concluded to be caused by or otherwise clearly related to the type of exceptions generated by non-warehousing system. When this occurs, at least one change to an underlying internal process may be made.

Per the method 200, when calculated correlations fall below the first defined threshold but above the second defined threshold, they are considered to be inconclusive. In these cases, the instances of inventory shrinkage may then be correlated with another set of exceptions generated by the same or another customer system 142 and the results of that additional correlation may then be analyzed.

When calculated correlations fall below the second defined threshold, they are considered to be statistically insignificant. The inventory shrinkage is determined to be not related to a significant extent to the exceptions or processing events generated by the non-warehousing system in question.

Beginning at block 202, the inventory shrinkage analysis server 110 determines that a first correlation of a plurality of instances of a first type of inventory shrinkage with a first set of exceptions or events processed by a first customer system 142 is of a statistical significance greater than a first defined threshold. The type of inventory shrinkage, for example disappearance of a series of mobile devices 150, 160 from a specific warehouse, is determined to be significantly related to the processing events of the customer system 142, that may be a ticketing system or product ordering system.

At block 204, the inventory shrinkage analysis server 110 implements or recommends a first process change to a first process based on analysis of the first correlation. The first process may be related to the use of the ticketing system or the product ordering system.

At block 206, the inventory shrinkage analysis server 110 determines that a second correlation of a plurality of instances of a second type of inventory shrinkage with a second exception processed by a second non-warehousing system, for example the customer system 144, is of a statistical significance greater than a second defined threshold, but is less than the first defined threshold, and is therefore inconclusive. This may further suggest determining a third correlation using the second type of inventory shrinkage. The correlation in this case has fallen into the range wherein it is too low to be considered definitely cause and effect related but high enough to warrant further analysis.

At block 208, the inventory shrinkage analysis server 110 determines the third correlation of a plurality of instances of the second type of inventory shrinkage with a third processing event associated with a third non-warehousing system wherein the third correlation is determined to be of a statistical significance greater than the first defined threshold. At block 208, the type of inventory shrinkage analyzed at block 206 is correlated to another and different type of processing event generated by a third customer system 142. The third customer system 142 may be a fraud database or fraud detection system. In this instance, at block 208, the correlation is determined to be above the first defined threshold. It is therefore significant and considered to evidence a causative or other relationship. The lack of conclusiveness determined at block 206 warranted performing correlation with another set of events from another non-warehousing system and the additional effort was shown to be justified.

At block 210, the inventory shrinkage analysis server 110 implements or recommends a second process change to a second internal process based on an analysis of the second correlation and the third correlation. At block 210, a change is made to a process of the telecommunications service provider 140, contractor, or other involved party to correct the problem related to the second type of inventory shrinkage. It may involve correcting a detected defect in the fraud detection system.

At block 212, the inventory shrinkage analysis server 110 determines that a fourth correlation of a plurality of instances of a third type of inventory shrinkage with a fourth exception processed by a fourth non-warehousing system is of a statistical significance less than the second defined threshold. The fourth non-warehousing system may be the customer system 146. This correlation is determined to be not of statistical significance.

At block 214, the inventory shrinkage analysis 110 server disregards the fourth exception as related to the fourth type of inventory shrinkage based on an analysis of the fourth correlation. If the telecommunications service provider 140 wishes to further investigate the third type of inventory shrinkage, the telecommunications service provider 140 may decide to correlate the instances of the third type of inventory shrinkage with one or more processing events generated by another customer system 142, 144, 146.

Summarizing the method 200, three different sets of instances of inventory shrinkage were correlated to three separate sets of processing events generated by three different customer systems 142, 144, 146. In the first case, positive and significant correlation was found that resulted in corrective action being taken with a process associated with the telecommunications service provider 140, contractor, or other involved party. In the third case, the set of instances of inventory shrinkage and the processing events of the customer system 142 generating the events were found to be unrelated and those processing events were determined to not be of value in discovering the source of the inventory shrinkage in the third case.

Further summarizing the method 200, in the second case of inventory shrinkage, two correlations were performed. The first correlation fell into a range that was found to be inconclusive, i.e. marginally significant and perhaps justifying further examination. The inventory shrinkage was then correlated with another set of processing events from a different customer system 144 than was examined in the previous correlation. Statistical significance was found in this case. The method 200 demonstrated the setting of levels of statistical significance and the value of calculating additional correlations when an initial correlation is shown to be inconclusive.

Figure 3:
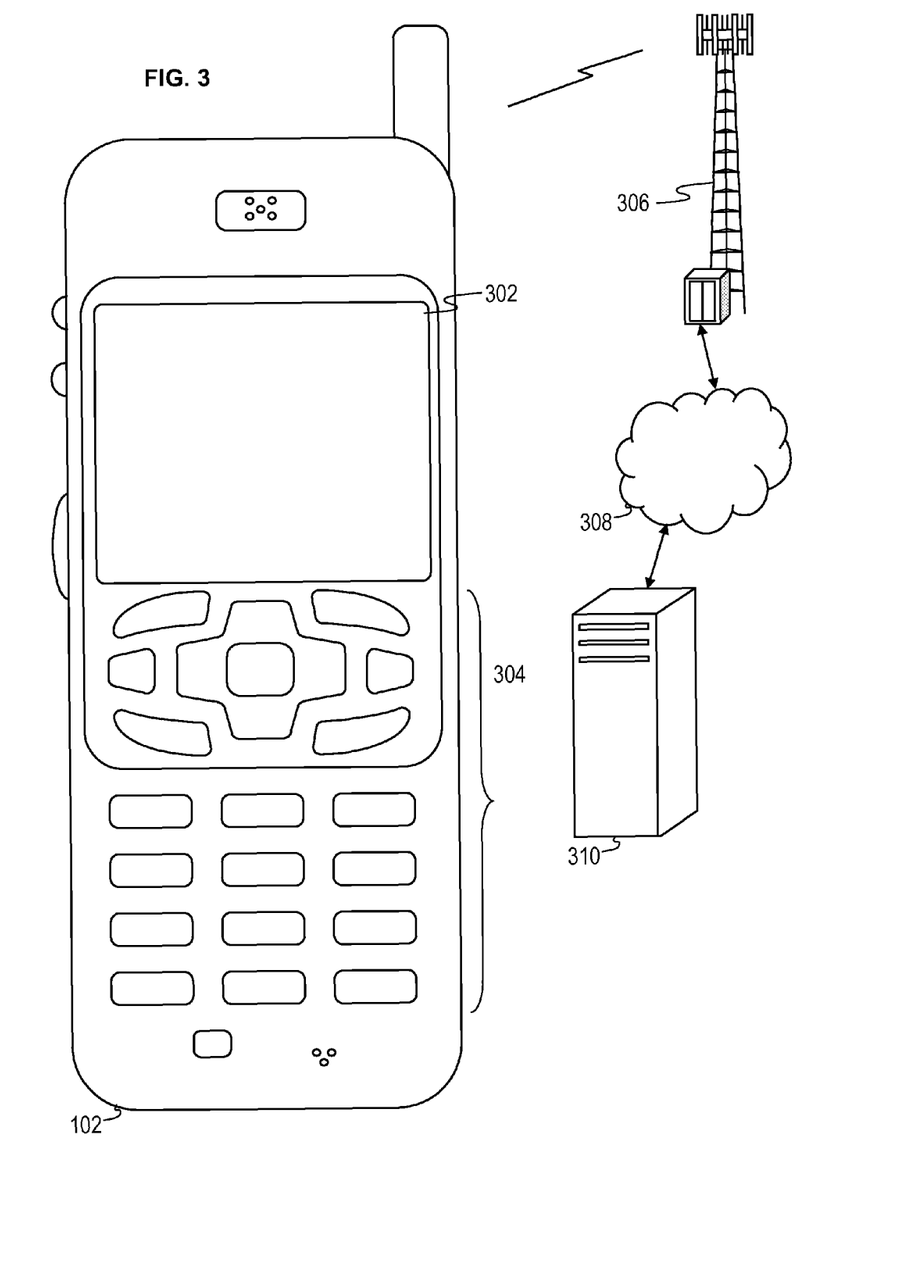
FIG. 3 is an illustration of a mobile device according to an embodiment of the disclosure.

FIG. 3 shows a wireless communications system including a mobile device 102. FIG. 3 depicts the mobile device 102, which is operable for implementing aspects of the present disclosure, but the present disclosure should not be limited to these implementations. The mobile device 102 may in some embodiments exemplify the electronic devices 140, 150, 160, 170 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 302 and a touch-sensitive surface and/or keys 304 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a base transceiver station (BTS) 306, or a peer mobile device 102.

The mobile device 102 may execute a web browser application which enables the display 302 to show a web page. The web page may be obtained via wireless communications with the base transceiver station 306, a wireless network access node, a peer mobile device 102, or any other wireless communication network or system. While a single base transceiver station 306 is illustrated, it is understood that the wireless communication system may comprise additional base transceiver stations. In some instances, the mobile device 102 may be in communication with multiple base transceiver stations 306 at the same time. The base transceiver station 306 (or wireless network access node) is coupled to a wired network 308, such as the Internet. Via the wireless link and the wired network 308, the mobile device 102 has access to information on various servers, such as a server 310. The server 310 may provide content that may be shown on the display 302. Alternately, the mobile device 102 may access the base transceiver station 306 through a peer mobile device 102 acting as an intermediary, in a relay type or hop type of connection.

Figure 4:
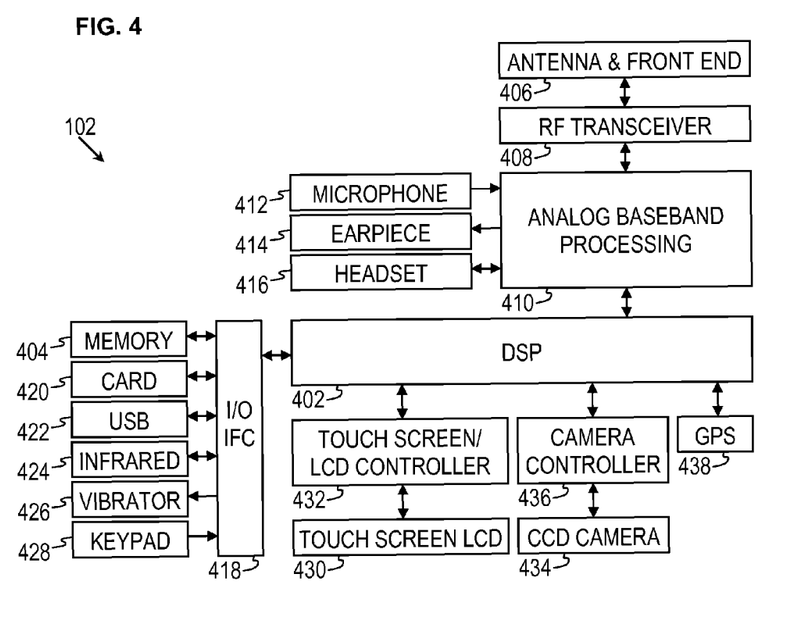
FIG. 4 is a block diagram of a mobile device according to an embodiment of the disclosure.

FIG. 4 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 402 and a memory 404. As shown, the mobile device 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the mobile device 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the mobile device 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 102 to send and receive information from a radio access network (RAN) or some other available wireless communications network or from a peer mobile device 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the mobile device 102 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example, by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the mobile device 102 to function as a peripheral device to exchange information with a personal computer or other computer system. The infrared port 424 and other optional ports such as a Bluetooth interface or an IEEE 802.11 compliant wireless interface may enable the mobile device 102 to communicate wirelessly with other nearby handsets and/or wireless base stations.

The input/output interface 418 may further connect the DSP 402 to the vibrator 426 that, when triggered, causes the mobile device 102 to vibrate. The vibrator 426 may serve as a mechanism for silently alerting the user to any of various events such as an incoming call, a new text message, and an appointment reminder.

The keypad 428 couples to the DSP 402 via the input/output interface 418 to provide one mechanism for the user to make selections, enter information, and otherwise provide input to the mobile device 102. Another input mechanism may be the touch screen/LCD 430, which may also display text and/or graphics to the user. The touch screen/LCD controller 432 couples the DSP 402 to the touch screen LCD 430.

The CCD camera 434 enables the mobile device 102 to take digital pictures. The DSP 402 communicates with the CCD camera 434 via the camera controller 436. The GPS sensor 438 is coupled to the DSP 402 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 5:
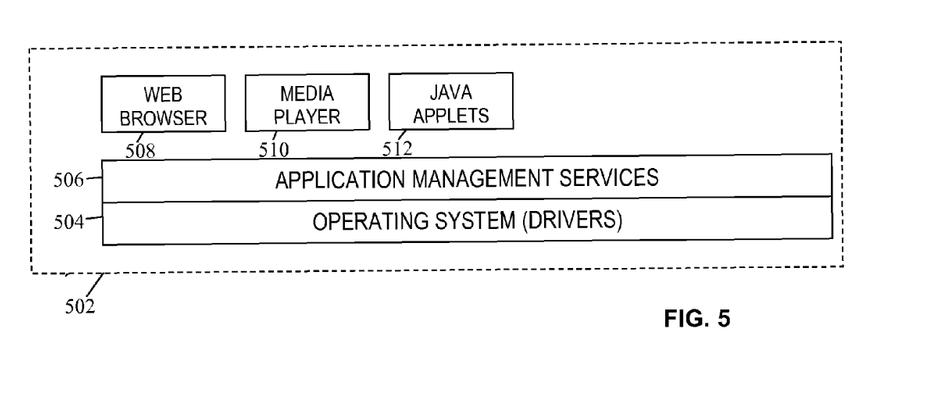
FIG. 5 is a block diagram of a software architecture for a mobile device according to an embodiment of the disclosure.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the mobile device 102. Also shown in FIG. 5 are a web browser application 508, a media player application 510, and JAVA applets 512. The web browser application 508 configures the mobile device 102 to operate as a web browser, allowing a user to enter information into forms and select links to retrieve and view web pages. The media player application 510 configures the mobile device 102 to retrieve and play audio or audiovisual media. The JAVA applets 512 configure the mobile device 102 to provide games, utilities, and other functionality.

Figure 6:
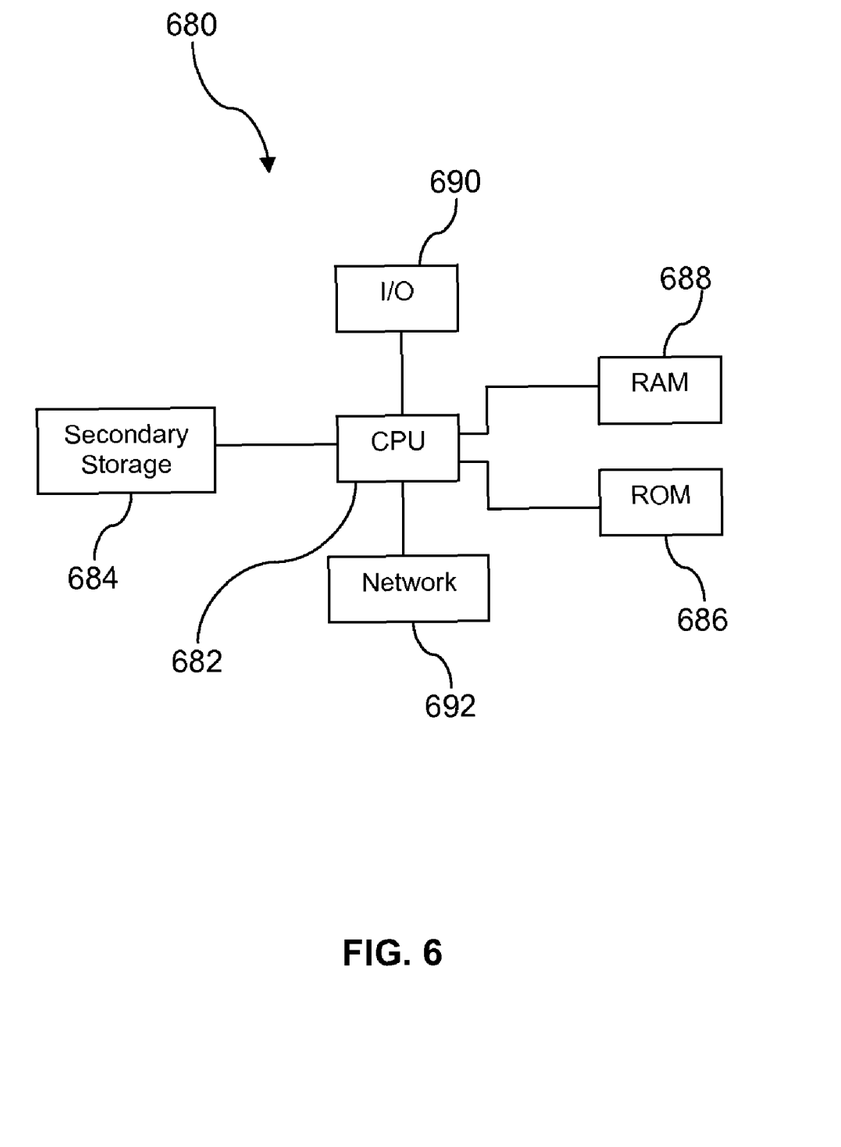
FIG. 6 illustrates an exemplary computer system suitable for implementing some aspects of the several embodiments of the disclosure.

FIG. 6 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data in part by directly accessing the computer program product, for example by reading from a CD-ROM disk inserted into a disk drive peripheral of the computer system 680. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system of inventory variance detection modeling, comprising:
 a server computer;
 a processor;
 a memory; and
 an application stored in the memory that, when executed by the processor,
  receives a report associating electronic serial numbers of devices with a plurality of instances of inventory shrinkage,
  assembles a list of electronic serial numbers of devices associated with instances of a first type of inventory shrinkage,
  receives a report of the processing history of the devices associated with the electronic serial numbers contained in the list in a plurality of information systems of an organization other than logistics, warehousing, and inventory management systems, wherein the plurality of information systems are selected from the group consisting of a customer order management system, an order problem resolution system, a problem ticket system, and customer billing and account management systems, analyzes the electronic serial numbers of the devices contained in the list in relation to each of a plurality of exceptions processed by at least one of the plurality of information systems, determines the statistical correlation of the electronic serial numbers contained in the list with each of the plurality of exceptions processed by the at least one of the plurality of information systems, and recommends a remedial or other action based on analysis of the statistical correlation.

2. The system of claim 1, wherein the instances of inventory shrinkage are associated with at least one of warehousing and logistics operations and wherein instances of inventory shrinkage are of at least the first type of inventory shrinkage and a second type of inventory shrinkage.

3. The system of claim 2, wherein the first type of inventory shrinkage is associated with instances of electronic serial numbers for devices recorded as entering a warehouse but not recorded as shipped to customers.

4. The system of claim 2, wherein the second type of inventory shrinkage is associated with instances of electronic serial numbers for devices recorded as entering the warehouse, subsequently shipped to the customer, and subsequently discovered in the warehouse among never-shipped inventory.

5. The system of claim 1, wherein events processed by the at least one of the plurality of information systems comprise processing of a report of a device received by a customer bearing an electronic serial number not matching the customer's order records, processing of a report of devices received by a customer bearing electronic serial numbers out of order, and processing of customer reports of inability to activate a device.

6. The system of claim 1, wherein the devices are mobile telephones.

7. A processor-implemented method of inventory variance detection modeling, comprising:

analyzing electronic serial numbers of a plurality of devices associated with a plurality of instances of a first type of inventory shrinkage in relation to a first exception processed by a first information system of a plurality of information systems of an organization other than logistics, warehousing, and inventory management systems, wherein the plurality of information systems are selected from the group consisting of a customer order management system, an order problem resolution system, a problem ticket system, and customer billing and account management systems;

determining that a first correlation of the electronic serial numbers associated with the plurality of instances of the first type of inventory shrinkage with the first exception processed by the first information system is of a statistical significance greater than a first defined threshold;

recommending a first process change to a first internal process based on analysis of the first correlation;

analyzing electronic serial numbers of a plurality of devices associated with a plurality of instances of a second type of inventory shrinkage in relation to a second exception processed by a second information system of the plurality of information systems;

determining that a second correlation of the electronic serial numbers associated with the plurality of instances of the second type of inventory shrinkage with the second exception processed by the second information system is of a statistical significance greater than a second defined threshold, is less than the first defined threshold, and is therefore inconclusive, and further suggesting determining a third correlation using the second type of inventory shrinkage;

analyzing electronic serial numbers of the plurality of devices associated, with a plurality of instances of the second type of inventory shrinkage in relation to a third exception processed by a third information system of the plurality of information systems;

determining the third correlation of the electronic serial numbers associated with the plurality of instances of the second type of inventory shrinkage with the third exception processed by the third information system, wherein the third correlation is determined to be of a statistical significance greater than the first defined threshold;

recommending a second process change to a second internal process based on an analysis of the second correlation and the third correlation;

analyzing electronic serial numbers of the plurality of devices associated with a plurality of instances of a third type of inventory shrinkage in relation to a fourth exception processed by a fourth information system of the plurality of information systems;

determining that a fourth correlation of the electronic serial numbers associated with the plurality of instances of the third type of inventory shrinkage with the fourth exception processed by the fourth information system is of a statistical significance less than the second defined threshold; and disregarding the fourth exception as related to the fourth type of inventory shrinkage based on an analysis of the fourth correlation.

8. The method of claim 7, wherein the first correlation exceeding the first defined threshold suggests that the first type of inventory shrinkage arises from at least one problem associated with the first internal process.

9. The method of claim 8, wherein the at least one problem associated with the first internal process is at least one of operational and related to process design of the first information system.

10. The method of claim 8, wherein the first process change is directed to resolving the at least one problem associated with the first internal process.

11. The method of claim 7, wherein determining the third correlation is based on determining that the second correlation is of a statistical significance greater than the second defined threshold and less than the first defined threshold, and wherein statistical significances greater than the second defined threshold and less than the first defined threshold are regarded as inconclusive.

12. The method of claim 7, wherein instances of inventory shrinkage comprise misplacement of items of inventory, unreported breakage of inventory, and improper packing of inventory.

13. The method of claim 7, wherein determining that the statistical significance of the third correlation is less than the second defined threshold suggests that the third type of inventory shrinkage is related to at least one warehousing activity and is not related to an internal process associated with one of the plurality of information systems.

14. The method of claim 13, wherein an internal process is associated with an action implemented by one of the plurality of information systems.

15. A system of inventory variance detection modeling, comprising:

a server computer;

a processor;

a memory; and an application stored in the memory that, when executed by the processor, analyzes electronic serial numbers of a plurality of devices associated with a plurality of instances of a first type of inventory shrinkage in relation to a first exception processed by a first information system of a plurality of information systems of an organization other than logistics, warehousing, and inventory management systems, wherein the plurality of information systems are selected from the group consisting of a customer order management system, an order problem resolution system, a problem ticket system, and customer billing and account management systems;

determines that a first correlation of the electronic serial numbers associated with the plurality of instances of the first type of inventory shrinkage with the first exception type processed by the first information system is below a first defined statistical threshold;

analyzes electronic serial numbers of the plurality of devices associated with a plurality of instances of the first type of inventory shrinkage in relation to a second exception processed by a second information system of the plurality of information systems;

determines that a second correlation of the electronic serial numbers associated with the plurality of instances of the first type of inventory shrinkage with the second exception type processed by the second information system is below the first defined statistical threshold;

determines, based on the first correlation and the second correlation, that the occurrences of instances of the inventory shrinkage are random;

analyzes a warehousing environment for sources of the inventory shrinkage;

determines that the occurrences of instances of the inventory shrinkage are associated with at least one of hiring, compensation, and training issues in the warehousing environment; and recommends changes to implementation of at least one of hiring, compensation, and training in the warehousing environment.

16. The system of claim 15, wherein the first exception and the second exception comprise processing of a report of a device received by a customer bearing an electronic serial number not matching the customer's order records, processing of a report of devices received by a customer bearing electronic serial numbers out of order, and processing of customer reports of inability to activate a device.

17. The system of claim 15, wherein based on the application determining that the occurrences of instances of the inventory shrinkage are random, the application determines that the instances of inventory shrinkage are not related to the first information system and the second information system.

18. The system of claim 15, wherein the plurality of devices comprise mobile telephones.

19. The system of claim 1, wherein when the statistical correlation is a statistical significance greater than a first defined threshold, the statistical correlation indicates that the first type of inventory shrinkage arises from problems associated with one or more of the plurality of information systems, and wherein when the statistical correlation is a statistical significance less than a second defined threshold, the statistical correlation indicates that the first type of inventory shrinkage arises from problems with a warehousing environment.

20. The system of claim 1, wherein the organization is a telecommunications services provider.

* * * * *